(12) United States Patent
York (10) Patent No.: US 6,466,468 B1
(45) Date of Patent: Oct. 15, 2002

(54) DIRECT CONVERSION PROGRAMMABLE POWER SOURCE CONTROLLER

(75) Inventor: Douglas S. York, Langley, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/062,022

(22) Filed: Jan. 31, 2002

(51) Int. Cl.$^7$ .................................................. H02M 7/00
(52) U.S. Cl. ............................................ 363/65; 363/71
(58) Field of Search ............................... 363/65, 69, 70, 363/71

(56) References Cited

U.S. PATENT DOCUMENTS

| | | | | |
|---|---|---|---|---|
| 3,931,563 A | * | 1/1976 | Stacey | 363/10 |
| 3,931,565 A | * | 1/1976 | Hase | 363/136 |
| 4,220,989 A | * | 9/1980 | Perilstein | 363/124 |
| 5,638,263 A | * | 6/1997 | Opal et al. | 363/65 |

* cited by examiner

*Primary Examiner*—Bao Q. Vu
(74) *Attorney, Agent, or Firm*—Black Lowe & Graham PLLC (57) ABSTRACT

The present invention is a system and method for a direct conversion programmable power source controller. The invention uses a sampling rate optimized for a transformer used to isolate or to step up or step down the power. The power is sampled at the source frequency and that sampling is phase-angle modulated according to a modulating signal at a frequency representing the sum of the frequencies of the power source and the desired output. After passing the power through the transformer, the invention then again chops that power to produce a multiplication of the power sinusoid with the modulation sinusoid. The output is filtered to integrate the waveform and fed to a load in delta. Between any two terminals of the delta connection, the output voltage presents as a well-formed sinusoid of controlled amplitude and frequency.

30 Claims, 5 Drawing Sheets

DIRECT CONVERSION PROGRAMMABLE POWER SOURCE CONTROLLER

FIELD OF THE INVENTION

This invention relates generally to power generation and, more specifically, to programmable three-phase output voltage and frequency.

BACKGROUND OF THE INVENTION

In most power generation applications, synchronous motors are driven to generate AC power. When so used, the frequency of AC power output is dependent upon the process used to apply torque to the synchronous motor. Constant torque at standardized values rarely exists in nature to precisely turn a synchronous machine. The rotational rate or angular velocity varies greatly. Because angular velocity is proportionate to the resulting frequency and voltage of AC power, where the angular velocity of the torque source is variable, the frequency and voltage of the resulting power is variable.

Randomly variable frequency AC power is not very useful. It is impossible to synchronize such power with a power supply network in a commercially practical manner. Such power cannot drive most applications designed for 60 Hz. line supply voltages. Few applications can tolerate such frequency variability.

To overcome the frequency variability in power generation, the solutions have been of two types, input and output solutions. Input solutions are mechanical and govern the power transfer to the synchronous machine. Output solutions condition electrical power garnered from the synchronous machine.

Traditionally, design constraints on power processing have required selection of components based upon the peak power to flow through those components rather than to design around the mean as in DC power systems. Periodically recurring peaks in the voltage and current waveforms for each phase develop recurrent power transfer well above the mean. Nonetheless, the power drawn from such a system as an aggregate is constant. For instance, the total power drawn from a balanced three-phase source by a balanced resistive load is constant. That is $$P_t(t) = (V^2/R)[\sin^2\omega t + \sin^2(\omega t + \phi) + \sin^2(\omega t + 2\phi)]$$

$$= 1.5(V^2/R) \qquad (1)$$

where $P_t$=time value of power
  V=peak line voltage
  R=load resistance (per phase)
  $\omega$=source frequency
  $\phi = 2\pi/3$ This fact is exploited in the cycloconverter at discrete frequencies. Small fluctuations in frequency are passed to the output. This need not be the case. The power transferred from source to load is not a function of time. The transfer of power can be accomplished without storing energy within the processor between input voltage cycles.

Because the power is independent of time and therefore phase, there exists a means, by aggregating the outputs from the phases to subject several of the components of the system to constant rather than varying power over time. Modulating the waveforms as the inventive apparatus does, "knocks the corners off" of the lower frequency waveforms as they come off the generator. In doing so, the inventive apparatus removes the need to accommodate the peaks of instantaneous power. The inventive system presents a system producing well-formed power output. Without converting and inverting power to and from DC power, the inventive system comprises smaller transformers and power storing filters than conventional means.

The traditional input solution to electrical power generation in applications such as aircraft has been through the Constant Speed Drive (CSD) coupled to a generator providing, for example, 115 VAC with three-phase power at a constant 400 Hz. In more recent times this arrangement has combined the CSD and generator into an Integrated Drive Unit, or IDU. With a constant frequency power output this has been a creditable solution, albeit expensive to buy and to maintain.

More recently, the output solution has been the Variable Frequency (VF) and cycloconverter systems. Cheaper of these two options, VF presents the load with power such as 115 VAC, three-phase power but only has a distribution capability at a frequency proportional to the engine speed. For a turbofan engine, for instance, this is usually 2:1. However, because of the wide range of frequency variation, power conditioning would be essential for almost all cases and, when added to the procurement, the additional cost of attendant motor controllers becomes prohibitively expensive.

In recent years, power has been generated with a Variable Speed Constant Frequency (VSCF) cycloconverter. A cycloconverter is a power electronics device designed to provide a variable voltage, constant frequency AC drive in a one stage operation, suitable for supply to an AC motor. These devices work by generating very high frequency three-phase power then selectively drawing voltages from the peaks of the three phases in a manner to construct rough approximations of lower frequency waveforms.

While a VSCF system unit (cycloconverter) does have the ability to produce AC and DC simultaneously, it does not produce clean waveforms. The voltage regulation is accomplished by a series of magnetic amplifiers, transformers, and bridge rectifiers. The VSCF drive uses a simple drive system and lets the alternator produce an electrical supply that is frequency wild, i.e. not well-controlled, which is then shaped by a solid-state electrical unit. Nonetheless, the resulting waveform includes several harmonics that impart an imaginary component to the power and may interfere with the function of the load.

Still another means of generating constant frequency power from a variable source of torque is based upon converting and rectifying power to DC before inverting the DC power to AC power such as 60 Hz. line voltage. This approach requires a converter that can sink current of opposite polarity to the output voltage. However, most converters cannot accommodate a non-unity power factor load. Additionally, for a given power level, in a single phase rectifier, the current pulses that comprise the ripple may be four to five times as large as the peak of the current waveform for an equivalent unity power factor load. Such current requires much larger conductors to minimize resistive losses. In polyphase rectifiers, the current peaks are not as large since smaller peaks occur more frequently, but the power quality is not as good because of large current transitions.

Both the cycloconverter and the devices for converting and inverting power use, transformer rectifier units that operate at line frequency chop power at low frequencies creating low frequency fundamental sinusoids thus requiring large and heavy transformers and large capacitors to store energy for smoothing peaks and filling valleys in the waveform. Introduction of such elements often adds reactive factors that affect the power factor. In such configurations the reactance causes the current to either "lead" the voltage or to "lag" the voltage. Like the input solution, power conditioning is necessary for power-factor correction. Often this includes the use of synchronous motors spinning in "no load" states. All of these solutions prove to be costly. The need for constant frequency power has justified these solutions.

There exists, then, an unmet need for a power unit for converting polyphase variable frequency AC power to constant frequency AC polyphase power while maintaining a unity power factor. Internal control of the magnitude of the voltage would further enhance the utility of such a power unit.

SUMMARY OF THE INVENTION

The inventive device exploits high frequency modulation of the signal to balance the power throughout the input voltage cycle. By modulating both the width and the amplitude of the power waveform, no power is lost and the power factor remains substantially the same as that of the load when the power factor is calculated at the input frequency.

The invention receives polyphase power of variable frequency and passes power of a set frequency. Relationships between phases are exploited according to known trigonometric identities. Each phase of the power is modulated distinctly until at the terminals of the transformer, where the output voltage represents the difference in potential pairs of terminals. To describe the invention here, the circuitry for handling a single phase of the power passed by the inventive device. For that purpose, an exemplary phase of the polyphase power supply is set forth here.

The present invention comprises a system and method for a direct conversion programmable power source controller. The invention controls three-phase power by accepting a reference signal; generating three modulating signals, each for one phase of the input power and having a frequency equal to the sum of the input frequency and the desired output frequency; accepting the three-phase electrical power from a wye connected power source; creating a high, chopping frequency for sampling; phase-angle-modulating the source signal at the chopping frequency according to each of the modulation signals. While in the high frequency state, the power passes easily through small two-winding transformers used either for isolation or for stepping up or stepping down the power. Once through the transformer, the invention then re-reverses the reversed power and chops a portion of each half-cycle in a manner that restores the pulse-width modulation of the power sinusoid by the modulating sinusoid. Reversing the polarity of each phase of electrical power at the phase-angle modulation frequency to reproduce the pulse-width modulated waveform at the output.

Filters on the output integrate the power waves before feeding the power to the load in delta. Between any two terminals of the delta connection, the output voltage presents as a well-formed sinusoid.

According to further aspects of the invention, the invention converts three-phase AC power to programmable frequency three-phase power without an intermediate DC stage and without large power storage devices.

The invention presents the source with the same power factor as the load.

According to the invention, conversion to high frequency reduces the size of necessary isolation transformers.

Also, inclusion of small high-frequency transformers allows correction for low-line conditions.

Further, the high-frequency conversion technique reduces the size of the input and output filters and allows those filters to produce near perfect sine waves.

Users can also optionally program output voltage and frequencies without component change by providing appropriate reference waveforms.

The invention also allows for bi-directional power flow thus to accommodate non-unity power factor (reactive), or braking or regenerative loads.

Wide separation of conversion and output frequencies eliminates phase errors due to input and output filters. The presence of a phase reference allows comparison with output waveforms for control loops. The control loops eliminate line disturbances such as phase-voltage imbalance and short-term spikes.

Further, the control process does not require digital signal processing. The inventive device may operate with a state machine with a look-up table for the desired waveforms, and a standard multiplying digital-to-analog converter.

The present invention provides means of converting three-phase power of variable frequency and amplitude to three-phase power of programmable and constant frequency and amplitude without an intermediate DC conversion.

BRIEF DESCRIPTION OF THE DRAWINGS

The preferred and alternative embodiments of the present invention are described in detail below with reference to the following drawings.

DETAILED DESCRIPTION OF THE INVENTION

The inventive device exploits high frequency modulation of the signal to balance the power throughout the input voltage cycle. By modulating both the width and the amplitude of the power waveform, no power is lost.

The invention receives polyphase power of variable frequency and passes power of a selectable frequency. Load current reflected to the source is similarly modulated so that the source current frequency tracks changes in the source voltage. Relationships between phases are exploited according to known trigonometric identities. Each phase of the power is modulated distinctly until at the terminals of the transformer where the voltage represents the difference in potential at distinct terminals of the transformer. To describe the invention here, FIG. 1a portrays the circuitry for handling a single phase of the power passed by the inventive device. For that purpose, an exemplary phase of the polyphase power supply is set forth here.

Figure 1A:
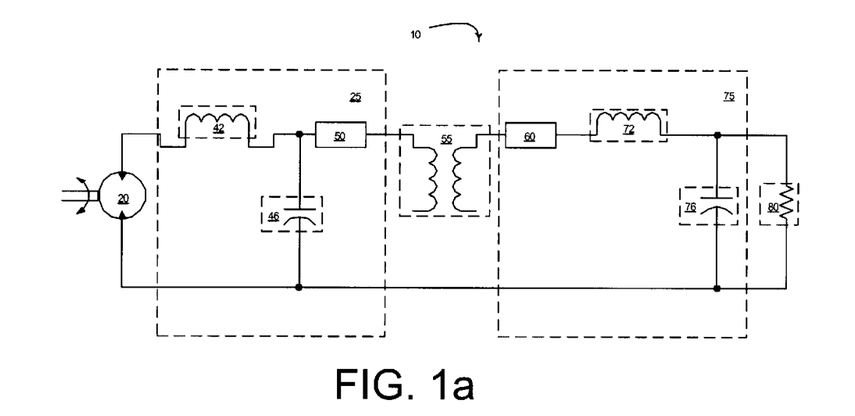
FIG. 1a is a schematic diagram of a single phase of the inventive power controller.
Figure 1B:
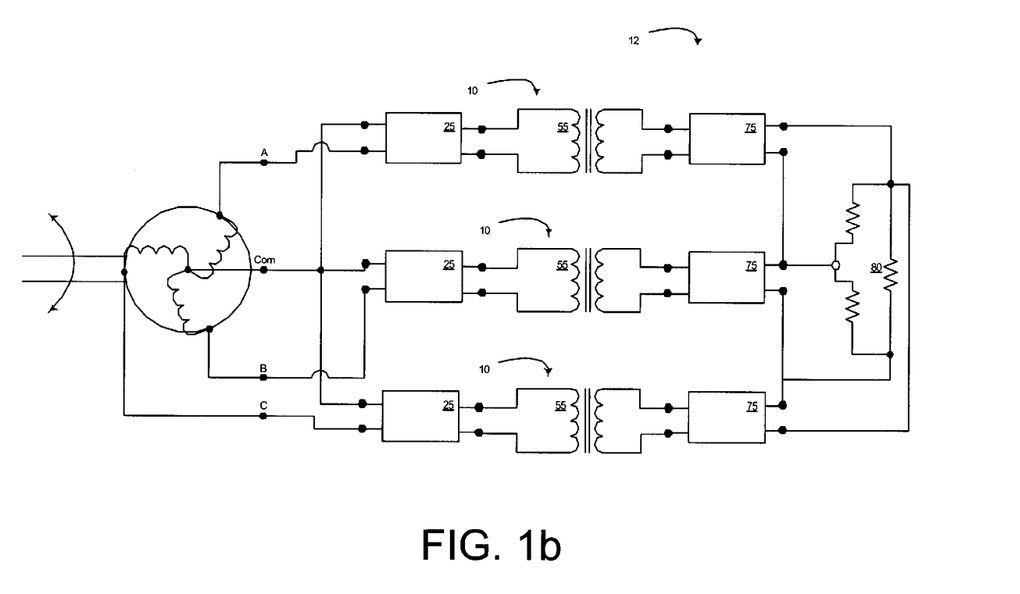
FIG. 1b is a block diagram placing the single phase as shown in FIG. 1a in context of a three-phase power supply.

Referring to FIGS. 1a and 1b. A generator 20 provides one of several phases of power to the circuit 10 shown as is shown in FIG. 1b. In most cases, this will be a driven three-phase synchronous machine connected in wye. The generator 20 supplies a voltage) to a pair of primary terminals of a transformer 55. A secondary pair of terminals of the transformer 55 then feeds power to or receives it from a load 80. The invention will receive current from a load as in the case of regenerative braking of a load.

The inventive circuit includes inductive and capacitive filter elements on the primary circuit, 42 and 46 respectively, and inductive and capacitive filter elements on the secondary circuit, 72 and 76 respectively. The filters, 42 and 46, are used to remove ripple from the source currents and load voltages. Because the filters need only remove very high frequency components of the signals, the filter elements 42 and 46, 72 and 76 need not store significant power. Finally, in electrical connection to the primary and secondary terminals of the transformer 55 there are a primary chopper 50 and a secondary chopper 60.

FIG. 1a is a schematic diagram of a circuit corresponding to a single phase of the inventive system. The system, in fact, comprises multiple circuits of the configuration shown in FIG. 1b. For purposes of illustration, this exposition will present a three-phase system. Those skilled in the electrical arts will readily see that the same inventive system is adaptable to any multiple-phase execution by replicating the circuit shown in FIG. 1a to correspond with each phase.

The primary chopper 50 performs one of the main roles, that of phase modulating the power signal in the inventive power supply, by deriving a modulation sinusoid in a feedback loop as set forth below. This modulation sinusoid as derived from the source voltage and reference signals, has a signal logic voltage level and a frequency representing the sum of the frequencies of sinusoids from the input power source sinusoid and a reference sinusoid at the desired output frequency. This reference sinusoid is, if desired, drawn from a power grid the power source 20 will supply.

The basic relationship between the elements of the circuit 10 exploits the process of modulating the incoming signal with a local oscillator frequency. The modulation is the multiplication of the power waveform by the reference sinusoid. This modulation suppresses the two fundamental frequencies as well as produces sum and difference frequencies. The modulation of the power signal relies upon a trigonometric identity expressed as follows:

$$\sin u \times \sin v = \frac{1}{2}[\cos(u-v) - \cos(u+v)] \qquad (2)$$

Thus the arithmetic description of the modulation of the first phase of three-phase power from a synchronous generator might look like this:

$$V_A = \Phi_A \times M_0 = V_{peak}[\sin(\omega_s t)] \times \sin(\omega_m t) \qquad (3)$$

$$V_A = \frac{V_{peak}}{2}(\cos(t(\omega_s - \omega_m)) - \cos(t(\omega_s + \omega_m)))$$

where $V$ = peak phase voltage $\alpha = \omega_s t$ $\beta = \omega_m t$;

The $\omega_s$ and $\omega_m$ are the source and the modulating frequencies respectively In a three-phase power system, each phase is offset from the other phases by $2\pi/3$ radians, or 120 degrees. The selection of the phase of the modulating frequency yields algebraic opportunities to suppress the upper resulting sideband from the modulation. Where the phase of the power is offset by $2\pi/3$ radians the modulating frequency is offset by $-2\pi/3$ radians or its phase equivalent $4\pi/3$ radians. If the phases are designated A, B, and C, the equations describing each of the remaining individual phases are:

$$V_B = \Phi_B \times M_- = V_{peak}\left[\sin\left(\omega_s t + \frac{2\pi}{3}\right)\right] \times \sin\left(\omega_m t - \frac{2\pi}{3}\right) \qquad (4)$$

$$V_B = \frac{V_{peak}}{2}\left(\cos\left(t\left(\omega_s - \omega_m + \frac{4\pi}{3}\right)\right) - \cos(t(\omega_s + \omega_m))\right)$$

$$V_B = \frac{V_{peak}}{2}\left(\cos\left(t\left(\omega_s - \omega_m - \frac{2\pi}{3}\right)\right) - \cos(t(\omega_s + \omega_m))\right)$$

$$V_C = \frac{V_{peak}}{2}\left(\cos\left(t\left(\omega_s - \omega_m + \frac{2\pi}{3}\right)\right) - \cos(t(\omega_s + \omega_m))\right) \qquad (5)$$

The algebra now reveals the presence of a cosine sum term, $\cos(t(\omega_s + \omega_m))$, present in each modulated phase. The presence of this cosine sum term in each phase presents an opportunity to eliminate it by subtracting one phase from another. Connecting the three outputs in delta such that the voltage across any pair of terminals yields a mathematical expression of the difference between any two terminals as output expressions:

$$V_{A-B} = V_{peak}\frac{\sqrt{3}}{2}\left(\sin t\left(\omega_s - \omega_m + \frac{2\pi}{3}\right)\right) \qquad (6)$$

$$V_{B-C} = V_{peak}\frac{\sqrt{3}}{2}(\sin t(\omega_s - \omega_m)) \qquad (7)$$

$$V_{C-A} = V_{peak}\frac{\sqrt{3}}{2}\left(\sin t\left(\omega_s - \omega_m - \frac{2\pi}{3}\right)\right) \qquad (8)$$

Each of the arithmetic processes set forth above can be effected in the combination of the primary chopper 50, the transformer 55, and the secondary chopper without the use of digital logic at power levels. "Chopping" occurs at a frequency significantly higher than the frequency of either the power supply or the desired output. According to the invention, the multiplication is a byproduct of the chopping process in conjunction with pulse-width modulation. Pulse-width modulation characterizes the output of the secondary chopper 60, that is the multiplication modulation. The width of each pulse represents the value derived from the sinusoidal modulation function, the height of the pulse, from the power sinusoid. Thus, when the resulting waveform is integrated over time, the resulting waveform is a smooth product-of-sines.

The pulse-width modulation is implemented by means of two distinct steps. First, the primary chopper 50 achieves phase-angle modulation. Then, once so modulated, the circuit 10 passes near-square-waves through the transformer 55 at chopping frequency that is very high relative to the power and reference sinusoids. The synchronous secondary chopper 60 inverts the second of each square wave pair to create a pulse-width-modulated waveform at the same chopping frequency.

The ability to create a phase-angle modulated square wave arises from parameters implicit in the nature of a sine wave itself. The magnitude of the sine function is bounded by the value one or unity, i.e.:

$$|\sin x| \leq 1, \text{ for all } x \qquad (9)$$

Without resorting to digital logic and without amplification, this relationship allows the modulation of the power waveform solely with switching devices. Rather than to mathematically multiply the instantaneous values of the power sinusoid with the instantaneous values of the reference sinusoid at each given moment, t, to produce a smooth function, the invention admits power during a portion of a sampling period corresponding to the value of the reference sinusoid.

Before considering the modulation of a power waveform by means of the primary chopper 50, consider the chopping of a simple constant DC voltage. "Chopping," as used, means the opening and closing of a switching device at a given frequency. A full chopping cycle comprises one period when the switch is in an open or non-conducting state and an immediately adjacent period when the switch is in a closed or conducting state. In the context of chopping, the duty cycle is the proportion the period of the conductive state bears to the whole cycle. Chopping is often used to supply a lesser DC voltage to a load from a higher DC voltage. For each segment, the power is chopped according to the following equation:

$$V_{out} = V_{in} \times D, \text{ where D is the duty cycle} \quad (10)$$

To modulate the power wave according to a second sine wave, one can vary the duty cycle according to the magnitude of the sine. Thus, for each period of one sampling interval, $\Delta t$, the switch will remain closed (or conductive) for a smaller period in proportion to the value of $\sin(\omega_m n\Delta t)$.

For each integer n, and for $$\Delta t = \frac{1}{\omega_{samp}}, V_{out} = V_{in} \times \sin(\omega_m n\Delta t) \quad (11)$$

Outside of the bounds of the first lobe of the sine wave, the value of the sine function goes negative. Equation 11 would normally be very problematic when seeking to modulate the power sinusoid. A duty cycle cannot become negative in length where the sine term becomes negative. It is for this reason that an intermediate step makes sense.

This average output is the key to the invention's two-step modulation. The primary chopper modulates the power signal by reversing the polarity at a high frequency. The onset of the reversal occurs after a fixed clock signal according to the term $0.5 \times (1+M \sin(\omega_m n\Delta t))$. Thus for a phase angle $\Phi$, the phase delay of the chopped power wave is:

$$\Phi(n\Delta t) = 0.5(1 + M\sin(\omega_m n\Delta t))2\frac{\pi}{\Delta t} \quad (12)$$

This primary chopping allows a balanced high-frequency power wave to pass through the necessary transformer 55. After the power passes through the transformer 55, the secondary chopper re-reverses the polarity of the power wave according to the fixed frequency clock signal, folding the power signal onto itself according to the constant term in the expression $0.5 \times (1+M \sin(\omega_m n\Delta t))$. Because the bridge operation inverts the polarity of the incoming voltage, the average of the bridge output is zero at D=0.5. As D varies from zero to 1, the output of the bridge varies from 100% negative polarity to 100% positive polarity; or from −1 to 1 times the source voltage. The synchronized and periodic reversal of the polarity by the secondary chopper suppresses the power wave causing the averaged output of the bridge to be:

$$V_{out} = 0 + M\sin(\omega_m n\Delta t). \quad (13)$$

The M term is a coefficient between zero and one, chosen for purposes of scaling the modulation, increasing or decreasing the magnitude of the sine curve corresponding to regulating the voltage output in the equation (10).

One of the virtues of the inventive primary chopper 50 is presentation of phase-angle-modulated square waves to the primary terminals of the transformer 55. Rather than presenting a pulse-width-modulated square wave of the power at the sampling frequency, the invention seeks only to accomplish half of the process of multiplying the sinusoids before placing the power through a transformer 55 (isolation, "step up," or "step down" as the determined by the application). Rather than to modulate the width of the pulses according to the sine, the voltage sent through the transformer as represented in Equation 13 is a phase modulated square wave.

The need for using a nearly true square-wave over a pulse-width-modulated wave is that the pulse-width-modulated waveform contains very low frequency components, much lower than those of the chopper square wave. To achieve this primary chopping of the waveforms, a frequency significantly higher than either the power or the modulating sine waves is selected. This is the frequency that will be passed through the transformer and is suitably any frequency selected to minimize hysteresis and eddy current losses while remaining high enough to yield good resolution of the power wave. Frequency might be chosen to optimize the characteristics of a chosen transformer. So long as it is suitably high to yield sufficiently formed sinusoids when passed through the final filters, the frequency is not critical to the operation of the invention.

A square wave that is phase modulated contains all of the information necessary to effect the product of sines modulation, but the fundamental frequency will be very close to the frequency of the phase modulated square wave. This fact yields an opportunity to select a frequency much higher than that of the input power wave and the modulation sine wave. Doing so will allow the use of a much smaller transformer in the invention as transformers designed for high frequency are generally much smaller than those necessary for lower frequency so long as the average voltage sent through the transformer is zero. The higher the lowest frequency, the shorter the period before the average returns to zero.

Transformers also require symmetrical waves for efficiency. Where the average voltage across the primary terminals over a period exceeds zero, the net resultant current will push the transformer towards core saturation. A symmetrical (the voltage peaks displace equally from zero, i.e. the magnitude of the negative and positive portions of the waveform is the same) will fulfill the requirement that the average is zero over two sampling periods. The higher frequency square wave allows the transformer to pass power without a long-term (greater than a single period at the higher frequency) effect on the transformer flux. Thus it is advantageous to pass symmetric square waves through the transformer and only then to further chop the phase modulated square waves to re-create the "product of sines" pulse-width-modulated waves discussed above.

Figure 2:
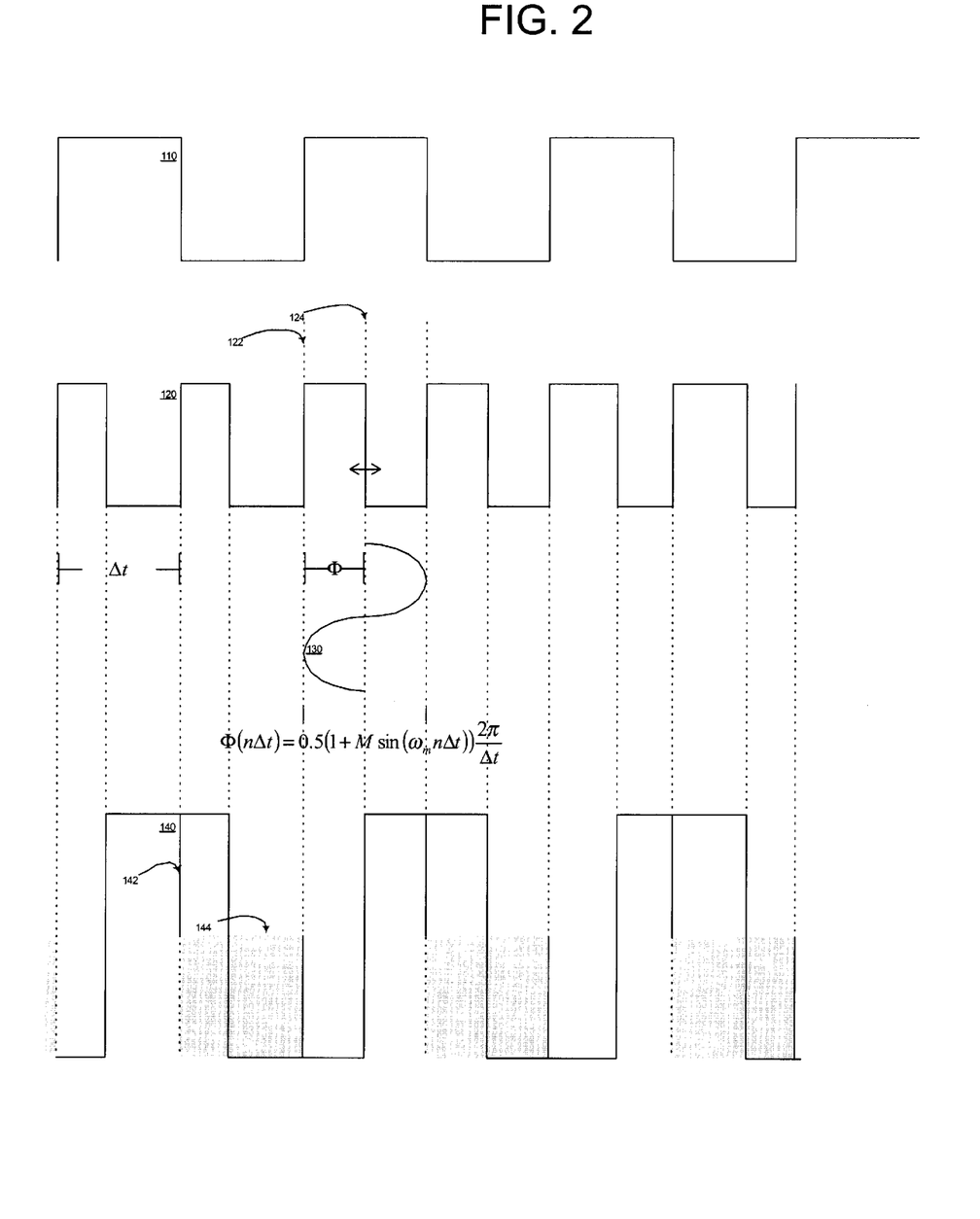
FIG. 2 is chart comparing the two constituent logic waveforms and the representative output of the two waveforms through an XOR gate.
Figure 3:
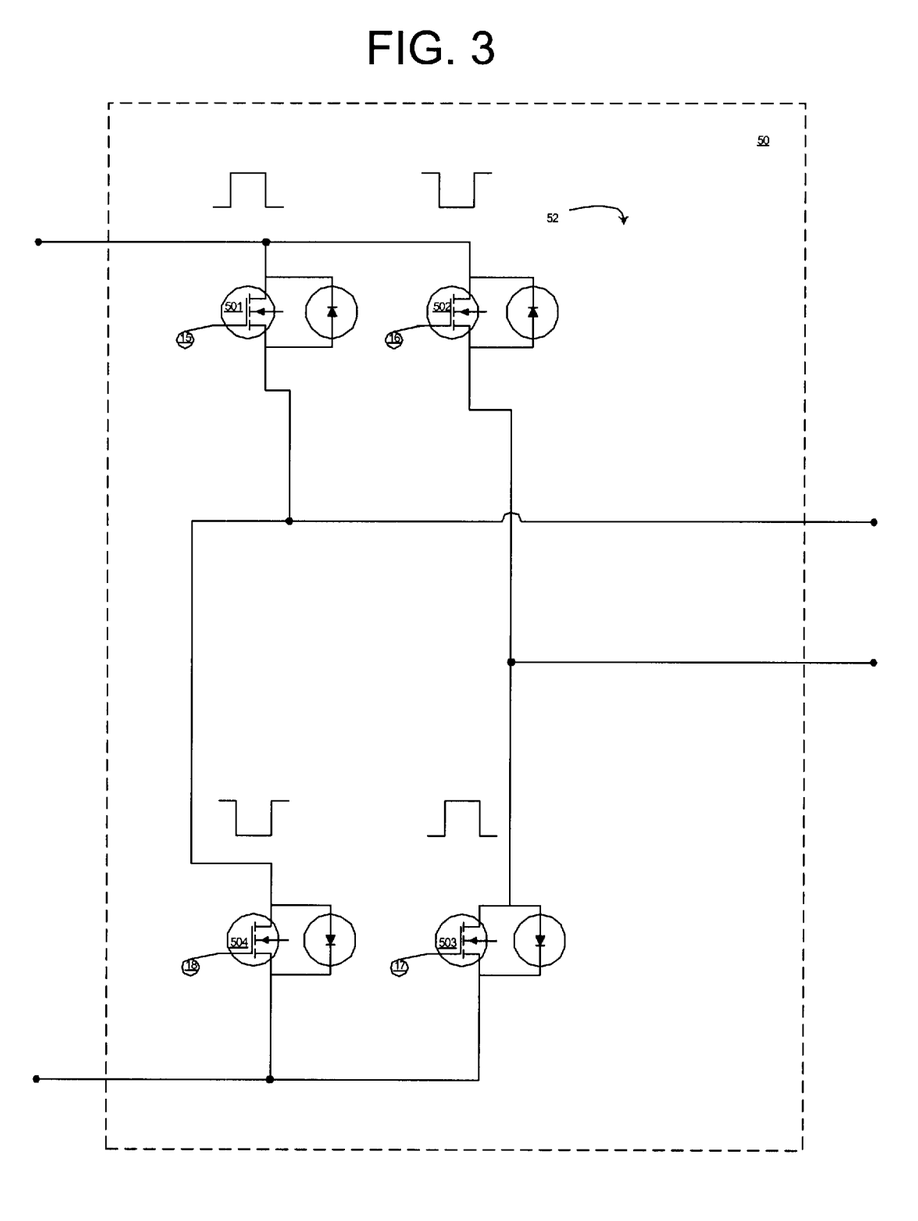
FIG. 3 is a detail schematic of the gating circuit used in the primary and secondary choppers.

In FIG. 2, the logic signals for effecting Equation 12 are shown. Curve 110 is a clock curve used to set the sampling frequency, $\omega_{samp}$, for purposes of admitting a portion of the power waveform. The curve 110 has a period of $\Delta t$, reflecting a sampling period. At is used here to prevent confusion with the period of either the power source or modulating sinusoids and to reflect the analogy to Riemann Sums. The next portion of the algorithm necessary to effect Equation 12 is the curve relating to the 0.5(1+M sin($\omega_m$n$\Delta$t))factor. To effect that portion of the equation, the triggering of gates in the primary chopper 50, discussed below in FIG. 3, will delay the onset of a square-wave 120 with a phase angle delay of $$\Phi(n\Delta t) = 0.5(1 + M\sin(\omega_m n\Delta t))\frac{2\pi}{\Delta t}$$

radians where $\omega_m$ is the frequency of the modulating sinusoid 130 referred to above. For each period, $\Delta t$, commencing at either the leading or the falling edge of the clock pulse 122, the pulse will remain logically high for a proportion of the $\Delta t$ period equal to 0.5(1+M sin($\omega_m$n$\Delta$t)) and then immediately fall to negative logic levels 124. Sending the clock curve 110 and the pulse-width-modulated square-wave pulse through an XOR gate results in the curve shown as curve 140. The result is a digital gate capable of directing switching at a rate to effect the 0.5(1+M sin($\omega_m$n$\Delta$t)) phase modulation.

Curve 140 is a phase-angle-modulated square-wave with glitches 142. In digital logic, a glitch is a sudden break in function or continuity, usually caused by switching error, of a transient nature. Here, during the period when curves 110 and 120 simultaneously transition from low to high or high to low, a glitch occurs. Because the logic is keyed to the clock curve 110, this glitch 142 is very transient but, it is, nonetheless, noted here. The glitch has no functional significance in this application because the inductive properties of the transformer remove the affects of the glitch 142 from practical consideration. Nonetheless, the glitch 142 serves as a benchmark for discussion of later processing.

With the resulting phase-angle-modulated curve 140, the invention is capable of appropriately chopping the incoming power curve. Because power line voltage levels would burn up most digital logic chips, an appropriate gating apparatus is necessary. FIG. 3 portrays a schematic diagram of one an exemplary gating device 52 that is a part of the primary chopper 50. Although any suitable switching device will serve, the gating device 52 comprises gangs of MOSFETs 501, 502, 503, and 504; that is the gating device 52 is a simple bridge. A logic signal fed to diagonal pairs of MOSFETs (e.g. 501 and 503 or 502 and 504) opens and closes the MOSFETs to appropriately pass the power curve to the transformer 55.

As indicated in the discussion of FIG. 2, curve 140 is the output of an XOR gate (not shown). Most commercial XOR gates also provide the complementary logic curve. In the complement, logical highs in the original curve correspond to logical lows in the complement and vice versa. The output of the XOR gate is fed to the gate terminals 15 and 17 of one diagonal pair of MOSFETs 501 and 503, respectively. The complementary output is fed to the gate terminals 16 and 18 of the remaining diagonal pair of MOSFETs 502 and 504, respectively. By this logical scheme, a voltage potential corresponding to the amplitude of the power curve is fed to the primary side of the transformer 55, with rapidly reversing polarity according to the logical transitions of the output of the XOR gate. The waveform at the primary terminals at the transformer 55 is a square wave at the clock frequency and power levels; it is offset from the clock wave by a time period corresponding to the magnitude of the modulating sine according to Equation 13. The wave is high frequency and symmetrical and thus allows the use of a smaller transformer.

After the primary chopper 50 sends this output wave through the transformer 55, the secondary chopper 60 demodulates the waveform so as to remove the half amplitude power wave that remains:

$$V_{out}(n\Delta t)=V_{in}\times[0.5(1+M\sin(\omega_m n2\pi\Delta t))]-0.5V_{in}=MV_{in}\sin(\omega_m n2\pi\Delta t) \quad (14)$$

Figure 4:
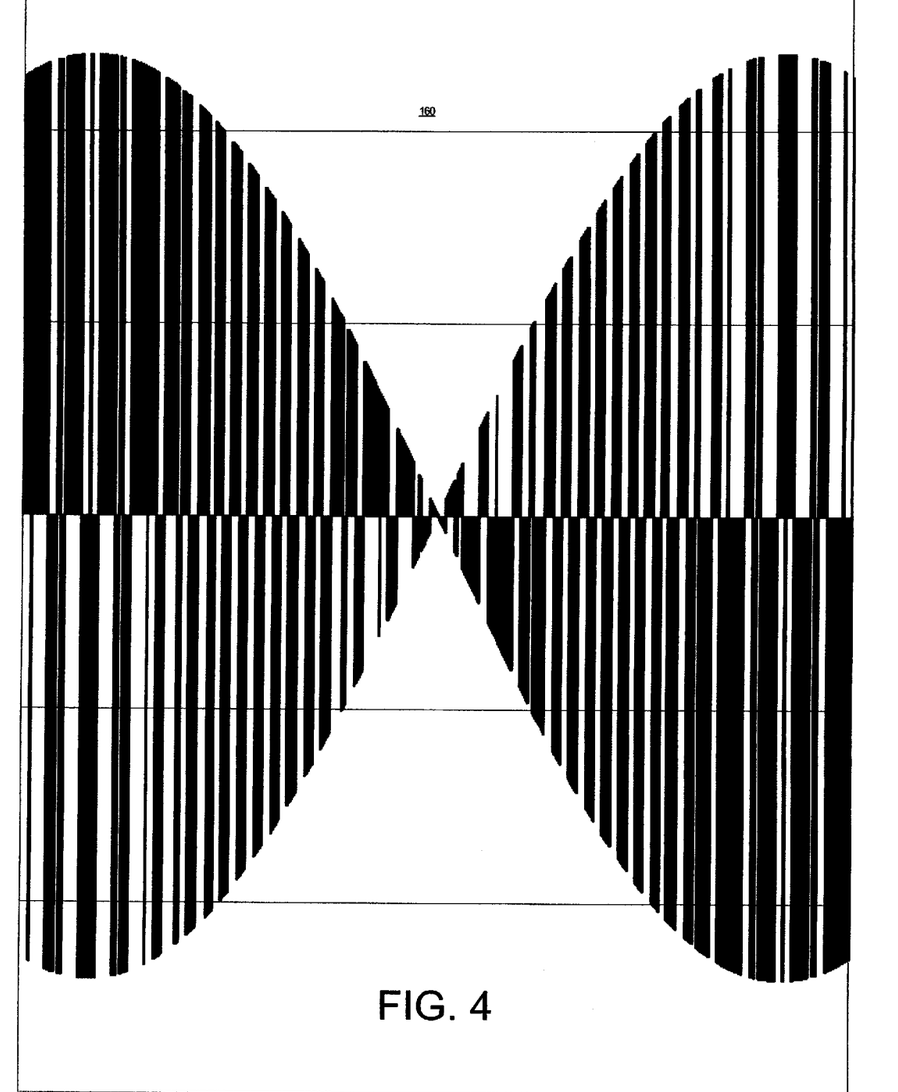
FIG. 4 is the tracing of a power wave pulse-width modulated by a second sine wave.

The secondary chopper 60 uses one half-cycle of the clock pulse 110 to invert that portion of the wave that either precedes or follows the clock transition 2. By this means, the secondary chopper inverts the curve between every other glitch portrayed in FIG. 2. The same gating device 52 shown in FIG. 3 is suitably used in the secondary chopper. The resulting pulse-width-modulated curve 120 now determines the periods of conductivity, and the clock transition 110 causes the reversal of the polarity of the output. Because the demodulation is synchronized to the modulation, the resulting waveform is the product of sines of Equation (3) shown in FIG. 4 as curve 160. By conducting that output to the load in delta and filtering the same with a low pass LC filter, the invention produces the power described in Equations 6, 7, and 8: smooth three-phase power at the desired frequency.

Another inventive aspect of the present invention is the use of a feedback loop to produce a waveform as the sum of frequencies, $\omega_m$, used for modulation. As indicated in Equation 3 above, the modulating frequency, $\omega_m$, will have a value of the sum of the desired output frequency and the source frequency. As frequencies are not readily added, the trigonometric identity set forth in Equation 2 is, again, employed to generate the modulating frequency, $\omega_m$. The interrelation of the power and control circuits provides a feedback loop that assures the regularity of the output waveform by assuring that the difference between the input frequency and the sum of the input and modulating frequencies remains the same.

To maintain this difference in the feedback loop, the invention draws from the input power curves from each phase of the power from the source 20. For each phase, the inventive device uses as input a reference waveform representing the desired output frequency. This might be a waveform drawn from the power grid, from a local oscillator or from a look-up table. Using this source frequency, $\omega_m$, from above and , $\omega_{ref}$, the invention generates a product of the sines according to the same trigonometric identity:

$$\Gamma_A = \sin\omega_s t \times \sin\omega_{ref} t = \frac{1}{2}(\cos(t(\omega_s - \omega_{ref})) - \cos(t(\omega_s + \omega_{ref}))) \quad (15)$$

$$\Gamma_B = \sin\left(t\left(\omega_s + \frac{2\pi}{3}\right)\right) \times \sin\left(t\left(\omega_{ref} + \frac{2\pi}{3}\right)\right) \quad (16)$$

$$= \frac{1}{2}\left(\cos(t(\omega_s - \omega_{ref})) - \cos\left(t\left(\omega_s + \omega_{ref} - \frac{2\pi}{3}\right)\right)\right)$$

$$\Gamma_C = \sin\left(t\left(\omega_s - \frac{2\pi}{3}\right)\right) \times \sin\left(t\left(\omega_{ref} - \frac{2\pi}{3}\right)\right) \quad (17)$$

$$= \frac{1}{2}\left(\cos(t(\omega_s - \omega_{ref})) - \cos\left(t\left(\omega_s + \omega_{ref} + \frac{2\pi}{3}\right)\right)\right)$$

The mathematics is easily performed at signal levels using an analog four-quadrant multiplier, a multiplying digital-to-analog converter, or state machine recalling a sine form from a memory look-up table, for example. The feedback loop employs one small but critical difference between feedback and the forward algorithms is the direction of rotation, or phase sequence, of the reference sine multipliers. For the feedback path, the direction is the reverse of the modulator set shown in the forward path. That is why the sum frequency, rather than the difference frequency, is preserved. The difference between phases results in a simple sine wave at a frequency equal to the sum of the input and modulation frequencies. For instance, as between the B and C phases:

$$\Gamma_B - \Gamma_C = \frac{1}{2}\left(\cos\left(t\left(\omega_s + \omega_{ref} + \frac{2\pi}{3}\right)\right) - \cos\left(t\left(\omega_s + \omega_{ref} - \frac{2\pi}{3}\right)\right)\right) \quad (18)$$

$$\Gamma_B - \Gamma_C = \frac{1}{2}\left(2(\sin t(\omega_s + \omega_{ref}))\left(\sin\left(\frac{2\pi}{3}\right)\right)\right)$$

$$\Gamma_B - \Gamma_C = (\sin t(\omega_s + \omega_{ref}))\left(\frac{\sqrt{3}}{2}\right)$$

The result is a sinusoid at a frequency representing the sum of the input and the reference frequencies, $\omega_m$, with the modulator for the input power A phase. The other two possible differences will yield similar results for the B and C phases of the input. Where the source frequency departs from a given value, the difference of frequencies term in Equations 3, 4, and 5 will remain constant; the sum of frequencies terms cancels in the resulting Equations 7, 8, and 9 and therefore has no effect upon the resulting waveform. The inventive device reliably provides constant frequency power.

With the feedback process in place, the invention is self-regulating such that fluctuations in the input frequency do not affect the output frequency. So, too, as earlier identified, the amplitude of the output sine is governed by the value of the modulating constant, M, in Equation 14. M can be used to control a simple feedback loop.

It is worthwhile to touch on the resulting unity or near unity power factor. Recalling that at the stage of the inventive device where the power is routed through the transformer 55, the square-waves are at a frequency much higher than that of either the source or the output power. After secondary chopping at the chopper 60, the fundamental frequency does drop but still remains much higher than the source and input power frequencies. The inductive filter element 72 (FIG. 1a) and the capacitive filter element 76 (FIG. 1a) can energize and de-energize at frequencies that are two orders of magnitude higher than that of the output power. It will be appreciated, though, that the filter elements 72 and 76 may energize and de-energize at frequencies that are either greater than or less than two orders of magnitude higher than that of the output power, as desired. Thus such leading and lagging effects that they might introduce are de minimus at the output.

Figure 5:
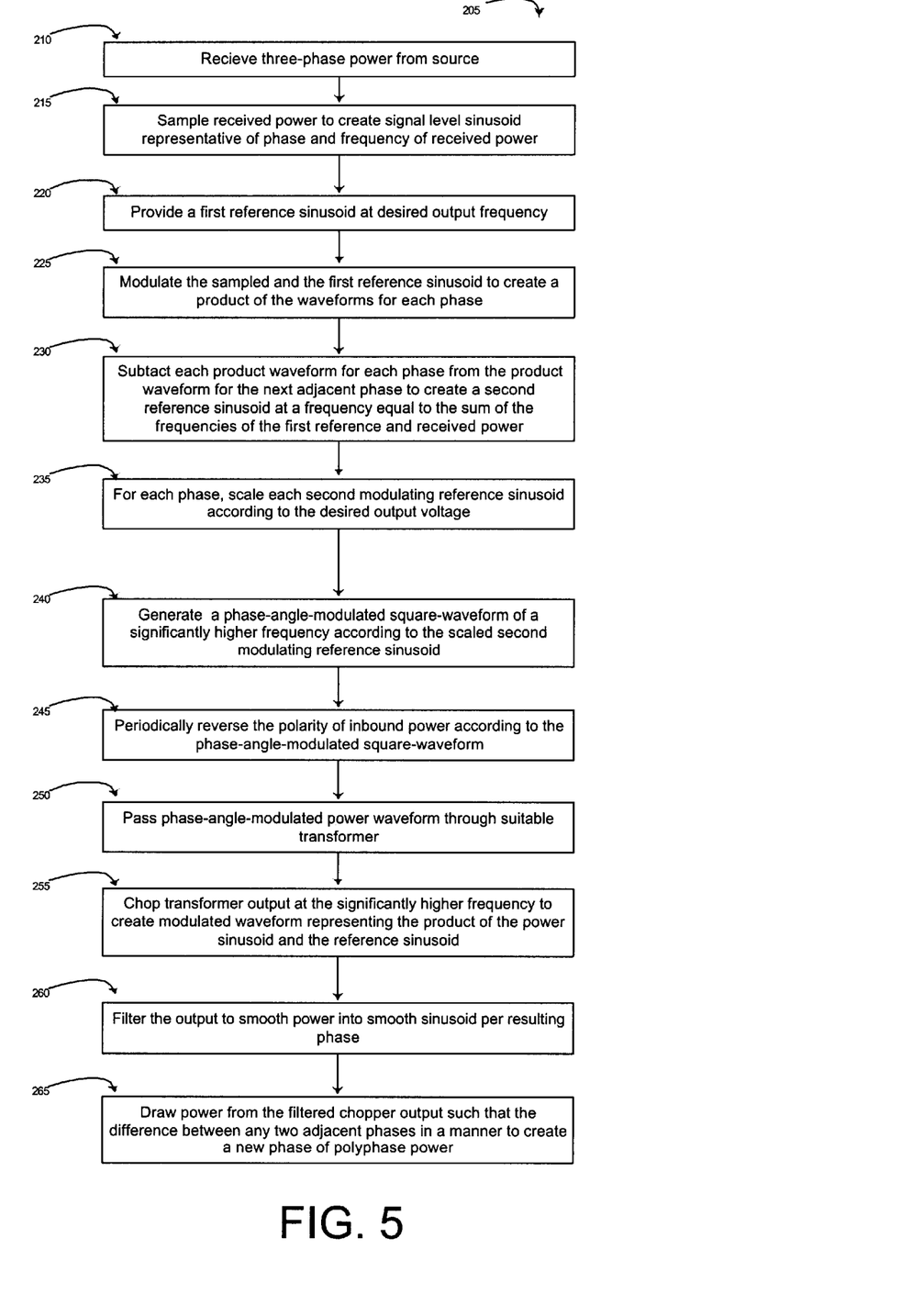
FIG. 5 is a flowchart setting forth the method of presenting three-phase programmable frequency and voltage to a load.

FIG. 5 sets forth a method 205 of producing programmable three-phase voltage and frequency according to the invention. Electrical power is received from a driven synchronous machine at block 210. To construct the feedback leg, at block 215, each phase of the source power is sampled. A reference sinusoid is drawn from either the power grid or a generated oscillation at block 220.

Having the two distinct logic-level voltage sine waves, the device then multiplies the sine values to create a product of sines for each phase according to Equations 15, 16, and 17 at block 225. At block 230, subtracting each phase from the next adjacent phase to result in three distinct sinusoids, each at a frequency representing the sum of the source frequency and the desired output frequency, according to Equation 18, results in three modulation sinusoids, each for one source phase.

At block 235, the invention employs one of two modes of the feedback process. Because the magnitude of the output voltage is proportionate to the coefficient used to scale the modulation sinusoid, the method monitors the output voltage and adjusts the coefficient between zero and one to achieve a constant or a programmable output voltage. The scaling is a dynamic and constant process thus overcoming fluctuations in the source voltage. As properly scaled, the modulating sinusoid then dictates the phase-angle modulation of the source power as it travels through the transformer.

The invention phase-angle creates and then continuously shifts a significantly higher frequency square-wave at block 235. The shifting is according to the corresponding modulation sinusoid for the phase of the source power to be modulated. At block 240, the polarity of the corresponding source power phase is then periodically reversed according to this phase-angle shifted square wave. The resulting power wave is sent through the primary terminals of a transformer 55 (FIG. 1a) at block 245. At block 250, on the secondary side, the resulting voltage is chopped and re-reversed according to the original square-wave to produce a pulse-width-modulated product of the source power phase and the "sum of the frequencies" modulating sine wave 160. Filtering the sine to integrate the resulting wave results in a smooth wave at 255. The power is supplied to the load in delta connection at block 260.

While the preferred embodiment of the invention has been illustrated and described, as noted above, many changes can be made without departing from the spirit and scope of the invention. For example, four, six, or eight phase power is equally susceptible to frequency and voltage programming according to the same modulation scheme. Furthermore, many simplifications to the presented embodiment are possible, including operation without a transformer, and the algorithm shown is applicable, or adaptable. Accordingly, the scope of the invention is not limited by the disclosure of the preferred embodiment. Instead, the invention should be determined entirely by reference to the claims that follow.

What is claimed is:

1. A direct conversion programmable power controller receiving polyphase input power at an input power frequency and having a polarity, the controller comprising:
   a primary chopper for each phase of electrical power, each primary chopper having an input, electrically connected in wye connection to each phase of power, having an output;
   a two-winding transformer for each phase of power, each transformer having primary and secondary terminals and connected electrically by its primary terminals to the output of the primary chopper; and
   a secondary chopper for each phase of power, each secondary chopper having an input connected electrically to the secondary terminals of the transformer and having an output connected to a load in delta connection.

2. The controller of claim 1 wherein the primary chopper periodically reverses the polarity of each phase of power from the power source at a frequency significantly higher than the input power frequency.

3. The controller of claim 2 wherein the primary chopper periodically reverses the polarity of the phase of power from the power source wherein an onset of the polarity reversal within a period varies according to a sinusoid.

4. The controller of claim 3 wherein the sinusoid has a frequency equal to a sum of the frequency of the power input frequency and a desired frequency of the output.

5. The controller of claim 4 wherein a feedback loop generates the sinusoid according to the power input frequency and a reference sinusoid.

6. The controller of claim 5 wherein the feedback loop samples the input power to determine the power input frequency.

7. The controller of claim 5 wherein the feedback loop samples a power grid to generate the reference sinusoid.

8. The controller of claim 5 wherein the feedback loop generates the reference sinusoid by means of a state machine.

9. The controller of claim 5 wherein the feedback loop generates the reference sinusoid by means of a local oscillator.

10. The controller of claim 5 wherein the feedback loop generates the reference sinusoid from values stored in a look-up table.

11. The controller of claim 5 wherein the feedback loop generates the reference sinusoid by means of a GPS receiver.

12. The controller of claim 5 wherein the secondary chopper periodically reverses the polarity of the phase of power from the transformer at the frequency significantly higher than the input power frequency.

13. The controller of claim 12 wherein the secondary chopper conducts the phase of the power according to a duty cycle within each period and where the secondary chopper periodically reverses the polarity of the phase of power.

14. The controller of claim 13 wherein the duty cycle varies according to the sinusoid.

15. The controller of claim 13 wherein feedback loop samples the power at the load and varies a coefficient between zero and one according to the amplitude of the sampled power.

16. The controller of claim 15 wherein the duty cycle varies according to the product of the coefficient and the sinusoid.

17. The controller of claim 13 wherein the secondary chopper modulates the input power applied to the load according to the sinusoid.

18. The controller of claim 1 wherein the transformer for each phase of power comprises a multi-phase two winding core transformer.

19. The controller of claim 1 wherein the transformer for each phase of power comprises a "step-up" transformer.

20. The controller of claim 1 wherein the transformer for each phase of power comprises an "isolation" transformer.

21. The controller of claim 1 wherein the transformer for each phase of power comprises a "step-down" transformer.

22. The controller of claim 1, further comprising an input low-pass power conditioning filter including:
   an inductive element electrically connected in series between the poly-phase power source and the input of the primary chopper; and
   a capacitive element electrically connected in to the input of the primary chopper in parallel with the poly-phase power source.

23. The controller of claim 1, further comprising an output low-pass power conditioning filter including:
   an inductive element electrically connected in series between the load and the output of the secondary chopper; and
   a capacitive element electrically connected in to the output of the secondary chopper in parallel with the load.

24. A method for controlling three-phase electrical power, the power having a polarity and power frequency, the method comprising:
   generating a first electrical signal, having a first frequency greater than the power frequency of the three-phase electrical power;
   generating three second signals each of the second signals having a second frequency and being offset from the other second signals by phase-angles of $2\pi/3$ radians;
   providing the three-phase electrical power from a wye connected power source, each phase of electrical power being offset from the other phases of electrical power by phase-angles of $2\pi/3$ radians;
   phase-angle-modulating the first signal according to each second signal to produce a third signal at the first frequency to correspond with each phase of the three-phase power;
   reversing the polarity of each phase of electrical power at the first frequency according to the third signal that corresponds with the phase of electrical power;
   providing a two-winding transformer having primary and secondary terminals for each phase of electrical power;
   applying the phase of electrical power and the reversed phase of electrical power across each set of the primary terminals;
   chopping each phase of electrical power induced across each set of secondary terminals to pulse-width-modulate each phase of electrical power according to an instantaneous value of the second signal;
   applying the pulse-width-modulated electrical power from the secondary terminals to a delta connected load.

25. The method of claim 24, wherein providing three-phase electrical power includes filtering the power to remove ripple.

26. The method of claim 24, wherein applying the pulse-width-modulated electrical power includes filtering to integrate the output.

27. The method of claim 24, wherein generating a first electrical signal includes generating a square-wave.

28. The method of claim 24, wherein generating a first electrical signal includes generating a clipped-sine wave.

29. The method of claim 24, wherein generating a second signal includes generating a second signal at a frequency representing the sum of the frequency of the power frequency and a frequency of a desired output.

30. The method of claim 29, wherein generating a second signal further includes scaling the second signal to regulate the three-phase electrical power applied to the load.

* * * * *